United States Patent [19]

Fiore

[11] Patent Number: 5,474,262
[45] Date of Patent: Dec. 12, 1995

[54] SPACECRAFT STRUCTURE AND METHOD

[75] Inventor: John N. Fiore, Hagerstown, Md.

[73] Assignee: Fairchild Space and Defense Corporation, Germantown, Md.

[21] Appl. No.: 193,465

[22] Filed: Feb. 8, 1994

[51] Int. Cl.[6] ............................ B64G 1/22; B64G 1/50
[52] U.S. Cl. ................................ 244/158 A; 244/158 R
[58] Field of Search .......................... 244/158 R, 158 A, 244/159, 117 A

[56] References Cited

U.S. PATENT DOCUMENTS

| | | | |
|---|---|---|---|
| 2,941,759 | 6/1960 | Rice et al. | 244/117 A |
| 3,145,000 | 8/1964 | Mackie | 244/158 A |
| 4,786,015 | 11/1988 | Niggeman | 244/117 A |
| 4,807,831 | 2/1989 | Brewer et al. | 244/117 A |
| 4,880,681 | 11/1989 | Price et al. | 244/117 A |
| 4,919,366 | 4/1990 | Cormier | 244/158 A |
| 4,986,495 | 1/1991 | Stromath et al. | 244/117 A |
| 5,310,141 | 5/1994 | Homer et al. | 244/158 A |
| 5,324,146 | 6/1994 | Parenti et al. | 244/158 R X |

*Primary Examiner*—William Grant
*Attorney, Agent, or Firm*—Michael W. York

[57] ABSTRACT

Spacecraft structure for use in the construction of the outer wall of a spacecraft. The construction of the outer wall of the spacecraft includes a hollow cellular honeycomb material that is sandwiched between a thin outer curved solid panel and a thin solid inner panel that has at least a portion that has a substantially flat inner surface. The inner and/or outer panel have provisions for mounting at least a portion of the payload for the spacecraft utilizing a series of inserts secured to the inner or outer panel. The outer and/or inner spacecraft wall panel structure can also include heat pipes for use in heat transfer. In one embodiment of the invention the outer panel also includes a series of substantially flat surfaces. The invention also includes the method of construction of the spacecraft structure and its method of use.

8 Claims, 11 Drawing Sheets

SPACECRAFT STRUCTURE AND METHOD

BACKGROUND OF THE INVENTION

Spacecraft structures are very difficult to design and construct due to the many and often conflicting requirements. For example, the spacecraft structure must have sufficient strength to withstand the forces imposed upon it when it is launched into orbit. However, the launch vehicle cost per pound of in orbit spacecraft places definite weight limitations on the spacecraft. Orbiting spacecraft are also subjected to thermal gradients from the sun and the installed electrical equipment places further limitations on the types of materials that can be used in the structural architecture. These problems are compounded with smaller spacecraft that are typically launched on the smaller spacecraft that are typically launched on the smaller expendable launch vehicles which impose substantial geometric constraints.

The solutions to these problems associated with the construction of previous spacecraft structures have involved long lead time for design, analysis, and fabrication. Use of advanced high performance materials is often investigated as one means of solution. However, although such materials offer optimized weight, strength, and stiffness they also introduce high cost, long lead times, fabrication and integration problems, as well as less than optimal thermal and orbit degradation problems.

Typical spacecraft structures consist of a frame that supports most of the main loads and the rest of the structure is attached to this frame. This type of construction occupies considerable volume for the structure itself that might be more profitably used for the spacecraft payload. This type of construction may also make it more difficult to distribute the spacecraft payload in the desired manner.

Typically, spacecraft are constructed to a specific design for a specific mission. This involves advanced planning coupled with high non-recurring engineering costs, extended fabrication schedules and the requirement to obtain advanced materials that require special handling and fabrication processes and techniques.

In view of these past problems there is a definite need for a spacecraft structure that provides the required stiffness and strength to weight ratios without the need to use "advanced" materials. There is also a need for a spacecraft that provides a large volume for the payload and versatility for payload positioning at any time during the fabrication cycle.

BRIEF DESCRIPTION OF THE INVENTION

This invention relates to spacecraft structures and more particularly to spacecraft structures that support the loads placed upon the spacecraft.

Accordingly, it is an object of the invention to provide a spacecraft structure and method that effectively support the loads placed upon the spacecraft.

It is an object of the invention to provide a spacecraft structure and method that are structurally efficient.

It is an object of the invention to provide a spacecraft structure and method that use frameless construction.

It is an object of the invention to provide a spacecraft structure and method that use a simplified construction.

It is an object of the invention to provide a spacecraft structure and method that use a structure with a high strength to weight ratio.

It is an object of the invention to provide a spacecraft structure and method that use a structure that is easy to manufacture.

It is an object of the invention to provide a spacecraft structure and method that are low in cost.

It is an object of the invention to provide a spacecraft structure and method that provide for a high payload to structure to weight ratio.

It is an object of the invention to provide a spacecraft structure and method that result in a stiff structure.

It is an object of the invention to provide a spacecraft structure and method that result in a light weight structure.

It is an object of the invention to provide a spacecraft structure and method that result in a structure with good thermal stability.

It is an object of the invention to provide a spacecraft structure and method that result in a structure that permits easy mounting of the payload.

It is an object of the invention to provide a spacecraft structure and method that have increased versatility in locating the payload and mission peculiar equipment.

It is an object of the invention to provide a spacecraft structure and method that permit easy access to the payload.

It is an object of the invention to provide a spacecraft structure and method that provide a structure that meets stiffness and strength requirements for launch platforms.

It is an object of the invention to provide a spacecraft structure and method that provide a structure that withstands combined axial and lateral loads.

It is an object of the invention to provide a spacecraft structure and method that result in a structure that does not require advanced materials.

It is an object of the invention to provide a spacecraft structure and method that use a structure that uses readily available state-of-the-art materials.

It is an object of the invention to provide a spacecraft structure and method that use a structure that has minimum risk materials.

It is an object of the invention to provide a spacecraft structure and method that use a structure that can be prefabricated.

It is an object of the invention to provide a spacecraft structure and method that provide a structure that has growth flexibility.

It is an object of the invention to provide a spacecraft structure and method that can be used with spacecraft having a variety of exterior surfaces.

It is an object of the invention to provide a spacecraft structure and method that can be used with spacecraft having a smooth exterior surface.

It is an object of the invention to provide a spacecraft structure and method that can be used with spacecraft having an irregular exterior surface.

It is an object of the invention to provide a spacecraft structure and method that provide a structure that uses a known sandwich type construction.

It is an object of the Invention to provide a spacecraft structure and method that utilize a structure with good heat sharing.

It is an object of the invention to provide a spacecraft structure and method that have provisions for effective heat transfer.

It is an object of the invention to provide a spacecraft structure and method that utilize heat pipes.

It is an object of the invention to provide a spacecraft structure and method that utilize a structure that can be manufactured with low non-recurring costs.

It is an object of the invention to provide a spacecraft structure and method that utilize a structure that is feasible for use in modular type construction.

It is an object of the invention to provide a spacecraft structure and method that utilize a structure that has excellent component packaging efficiency.

It is an object of the invention to provide a spacecraft structure and method that are particularly well suited for use for smaller size spacecraft.

These and other objects are obtained from the spacecraft structure and method invention wherein the spacecraft structure includes a sandwich panel structure with a substantially flat inner panel, a curved exterior panel and a honeycomb material located between them. The exterior curved panel of the sandwich structure forms at least a portion of the exterior surface of a spacecraft. The interior and/or exterior panel has a series of mounting inserts in it for securing at least a portion of the spacecraft support equipment. The sandwich structure also has provisions for heat transfer which may include heat pipes located in the sandwich structure. In one embodiment the exterior has a series of flat surfaces and the interior has a curved panel that forms the sandwich structure. The method of the invention involves the manufacture of the sandwich panel structures with inserts and the use of the structures in the manufacture of a spacecraft.

BRIEF DESCRIPTION OF THE DRAWINGS

The invention will be hereinafter more fully described with reference to the accompanying drawings in which.

DETAILED DESCRIPTION OF THE PREFERRED EMBODIMENTS

Figure 1:
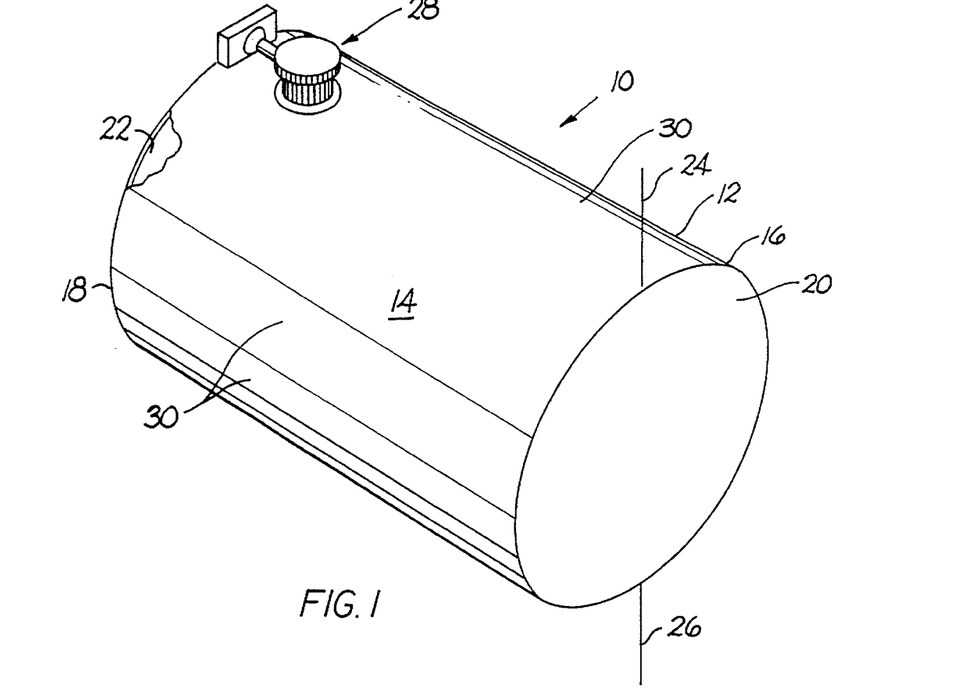
FIG. 1 is a perspective view of the spacecraft structure invention.
Figure 2:
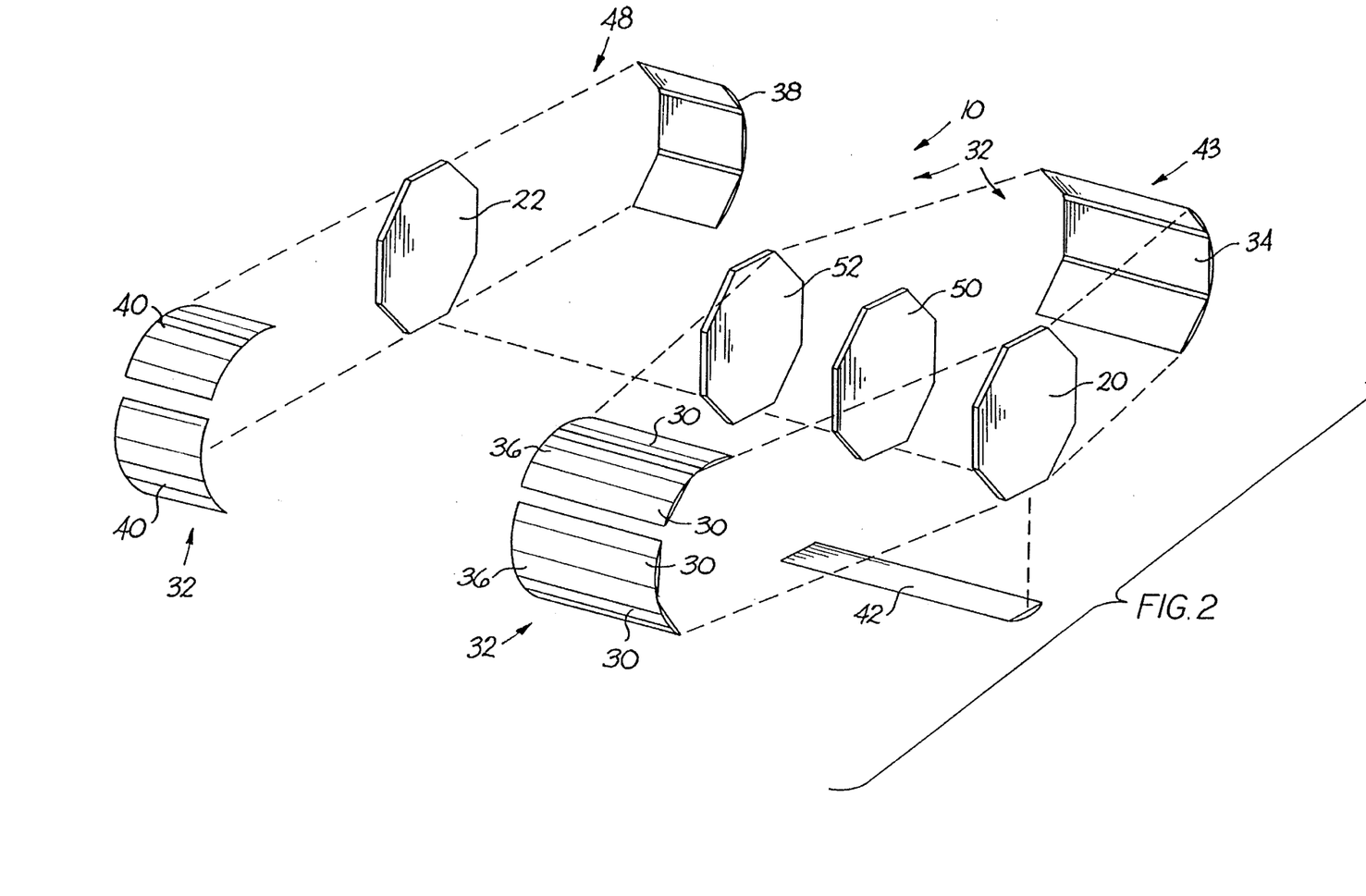
FIG. 2 is an exploded perspective view of the spacecraft structure invention illustrated in FIG. 1.

The spacecraft structure invention is illustrated in FIGS. 1 and 2 and is designated generally by the number 10. The spacecraft structure 10 could be a satellite comprising a generally cylindrical body structure 12 with a substantially smooth curved surface 14 that is shaped to substantially conform to the perimeter of a circle. The cylindrical body 12 has a forward end portion 16 and an aft end portion 18. The forward end portion 16 of the cylindrical body 12 is closed by a forward bulkhead or deck 20 and the aft end portion 18 of the cylindrical body 12 is also closed by an aft bulkhead or deck 22. As illustrated, the spacecraft structure 10 has two antennas 24 and 26 extending from its curved surface 14 plus some additional pieces of equipment designated by the number 28. The curved surface 14 itself comprises a series of substantially identical segments such as those designated by the number 30. The illustration of the spacecraft structure 10 in FIG. 1 shows the spacecraft structure 10 as it would appear after it had been launched into space orbit.

FIG. 2 is an exploded view of the basic spacecraft structure 10 illustrated in FIG. 1 that illustrates the various components that make up the spacecraft structure 10. As illustrated, the cylindrical body structure 12 comprises a series of shell members designated generally by the number 32. In the preferred embodiment, the series of shell members 32 would include one payload shell member 34, two payload shell members 36 and one bus shell member 38 and two bus shell members 40. These shell members 34, 36, 38 and 40 plus a removable pan member 42 serve to provide the exterior curved surface 14 for the body structure 12. The payload shell members 34 and 36 together with a portion of the removable pan member 42 form the major part of what is called the payload structure 43.

The forward end portion 16 of the body structure 12 is closed by the previously described thin substantially flat forward or payload deck 20 and the aft end portion 18 of the body structure 12 is closed by the previously described thin substantially flat aft deck 22. The shell members 38 and 40 form a major portion of a shell for what is called a core bus structure 48 and its forward portion is closed by a thin substantially flat forward deck 52. A thin substantially flat mid deck 50 is located substantially midway between the decks 20 and 52 within the shell members 32 and 43. As indicated in FIG. 2, the various shell members 34, 36, 38 and 40 each have curved outer panel segments, such as panel segments 30 for the shell members 36.

Figure 3:
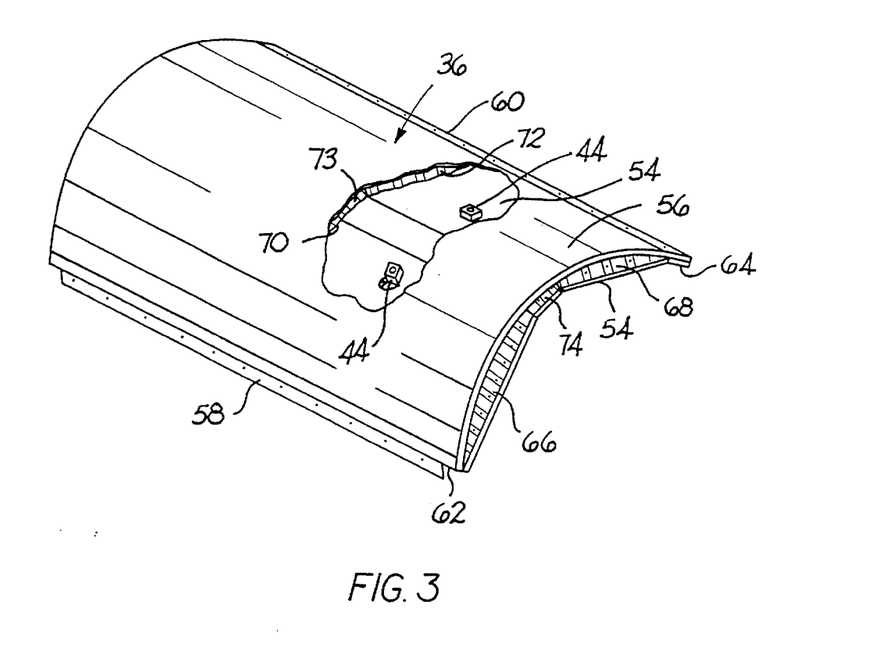
FIG. 3 is an enlarged perspective view of a portion of the spacecraft structure illustrated in FIG. 2 with portions broken away for clarity.

FIG. 3 is an enlarged view of the shell member 36 illustrated in FIG. 2 with portions thereof broken away. As illustrated in FIG. 3, the shell member 36 comprises an inner thin solid panel 54 and an outer thin solid curved panel 56. The panel 54 has inserts 44 in it that are used to mount payload and/or equipment within the payload section 43 of the spacecraft structure 10. The respective outer edges 58 and 60 of the curved outer panel 56 are connected to the respective outer edges 62 and 64 of the inner panel 54. The shell member 36 also comprises three honeycomb members 66, 68 and 74 that are located between the panels 54 and 56. As illustrated, the honeycomb members 66, 68 and 74 have respective honeycomb material 70, 72 and 73 that is located between the central portions of the panels 54 and 56.

Figure 4:
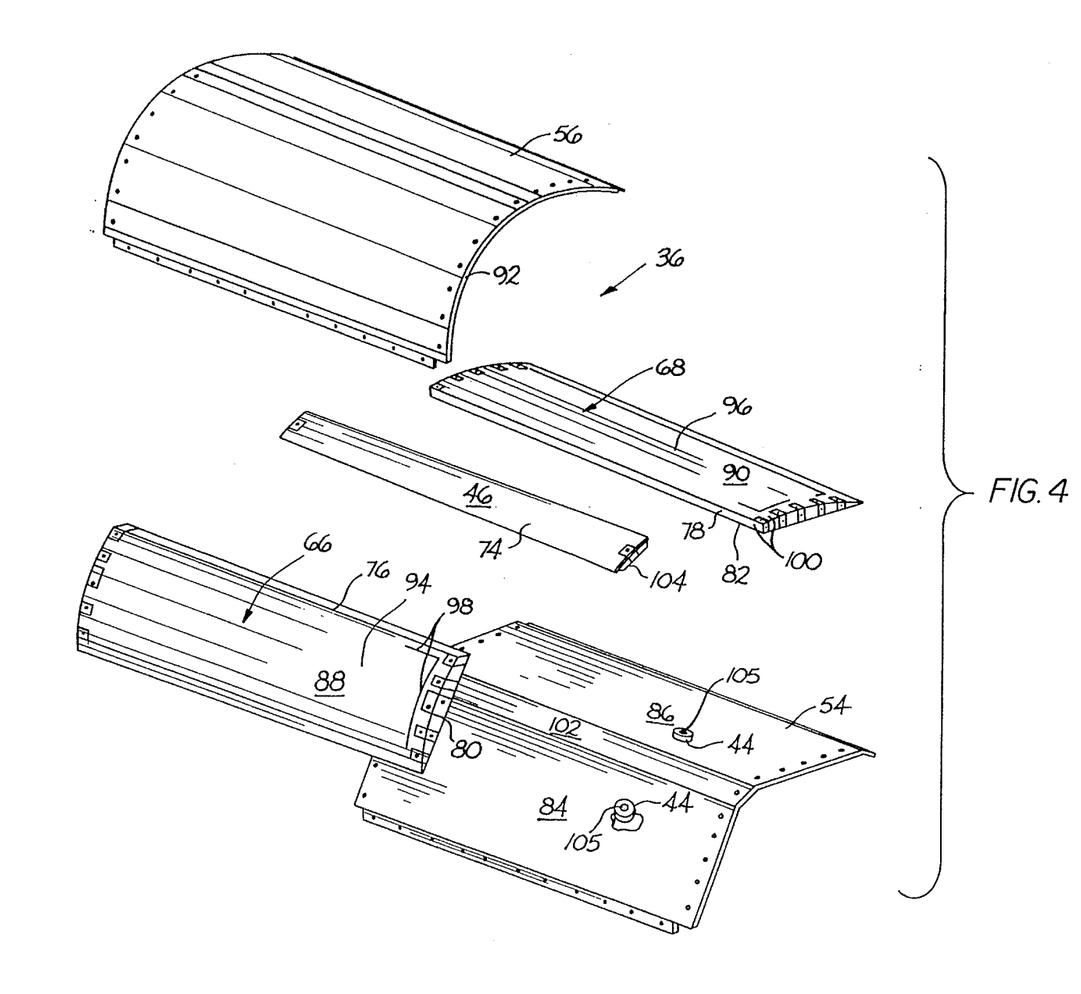
FIG. 4 is an exploded perspective view of the structure illustrated in FIG. 3.

FIG. 4 is an exploded view of the panel member 36 illustrated in FIG. 3 showing in greater detail the panel member 36 and its various components. FIG. 4 shows the previously mentioned panels 54 and 56 and the honeycomb members 66 and 68. As illustrated, the panel member 36 also includes an elongated honeycomb connecting member 74 that is located between and connects the substantially flat inner edges 76 and 78 of the respective honeycomb members 66 and 68. The honeycomb members 66 and 68 each have respective substantially flat inner surfaces 80 and 82 that are sized and shaped to conform to the respective substantially flat outer surfaces 84 and 86 of the panel 54. Each honeycomb member 66, 68 and 74 has a respective outer surface 88, 90 and 46 that is curved and sized to conform to the inner curved surface 92 of the outer curved panel 56.

Each honeycomb member 66 and 68 has an inner honeycomb portion 94 and 96 that are surrounded by respective stabilizing adhesive borders 98 and 100. The inner thin solid panel 54 also has an inner centrally located elongated substantially flat surface portion 102 that is sized and shaped to conform to the undersurface 104 of the elongated connecting member 74. As previously indicated, the panel 54 has the inserts 44 that are secured to the panel 54 and extend completely through the panel to its outer surfaces 84 and 86. These inserts 44 can have through holes or threaded holes 105 for mounting equipment and the like. All of the panel member 36 components 54, 56, 66, 68, and 74 are bonded together using conventional bonding techniques known in the art to produce the combined structure 36 illustrated in FIG. 3.

Figure 5:
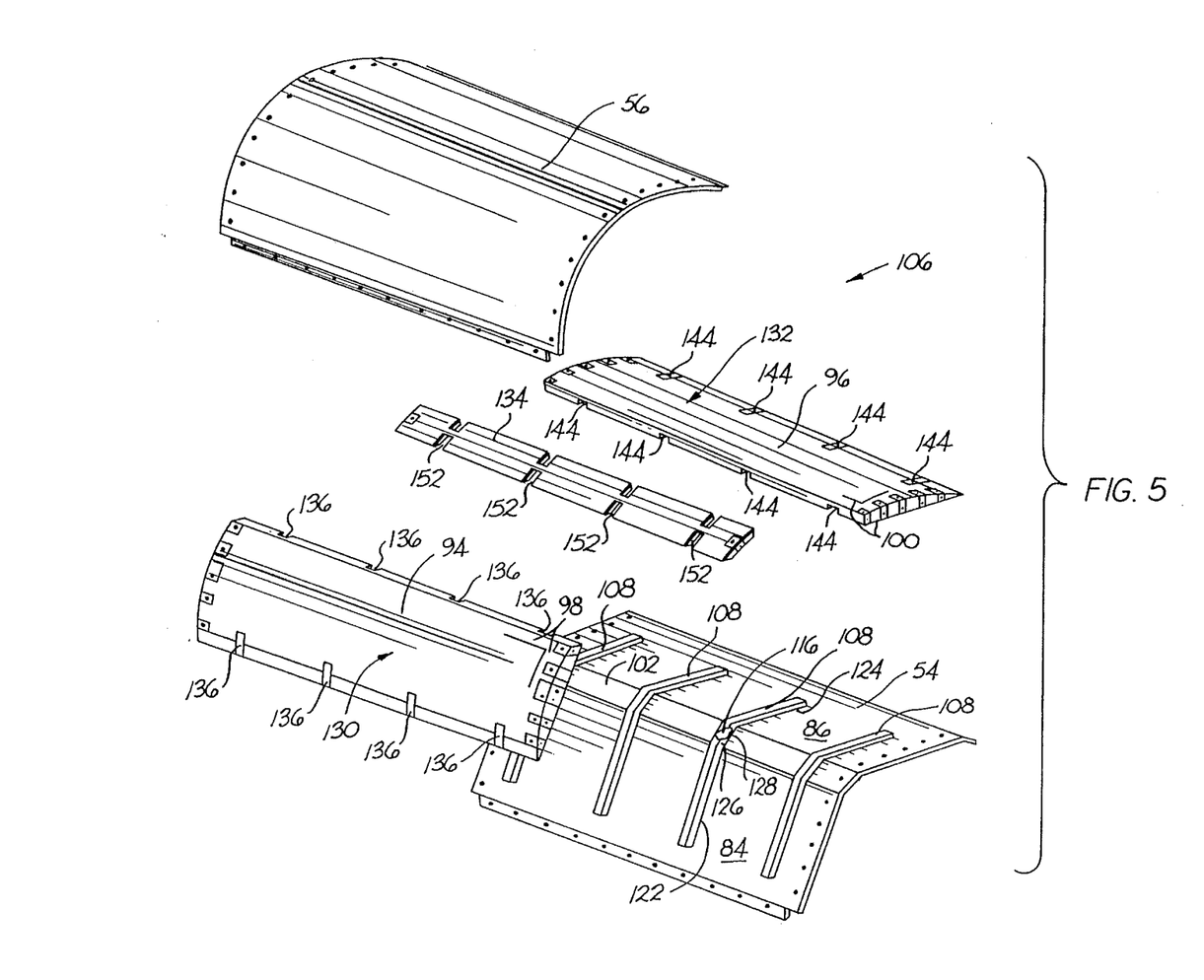
FIG. 5 is an exploded perspective view of an alternative to a portion of the spacecraft structure illustrated in FIGS. 2, 3 and 4 with certain portions broken away for clarity illustrating installed heat pipes as an additional embodiment of the invention.

FIG. 5 illustrates an alternative to the panel member 36 illustrated in FIGS. 3 and 4 that is designated generally by the number 106. As illustrated, the panel member 106 includes some of the same members as the previously described panel member 36, namely the panels 54 and 56. The panel member 106 also includes a series of generally rectangular hollow cross sectional equally spaced elongated heat pipe members 108. Each hollow heat pipe member 108 contains a heat transfer fluid such as the heat transfer fluid 116. Each heat pipe member 108 is a continuous hollow rectangular cross section tube whose respective undersides 122 and 124 substantially conform to and are in contact with the respective inner surfaces 84 and 86 of the panel member 54. These flat undersides 122 and 124 have a common and continuous connecting section 126 whose underside 128 substantially conforms to and is in contact with the flat surface portion 102 of the panel member 54.

The panel member 106 also has two honeycomb members 130 and 132 that are similar to the previously described honeycomb members 66 and 68 of the panel 36 and a connecting member 134 that is similar to the previously described member 74 of the panel 36. It should be noted that the connecting member 134 could be broken into a series of smaller members. The honeycomb member 130 has the same honeycomb center portion 94 and a stabilizing adhesive border 90 but is also has a series of slots 136 that are sized, shaped and located to receive adjacent portions of the respective heat pipes 108. The honeycomb member 132 also has the same honeycomb center portion 96 and the stabilizing adhesive border 100 but it also has a series of slots 144 that are sized, shaped and located to receive adjacent portions of the respective heat pipes 108. The member 134 also has a series of slots 152 that are sized, shaped and located to receive adjacent portions of the respective heat pipes 108. The various components of the panel member 106 are assembled in the same manner as the panel member 36 by bonding them together using conventional bonding techniques known in the art.

Figure 6:
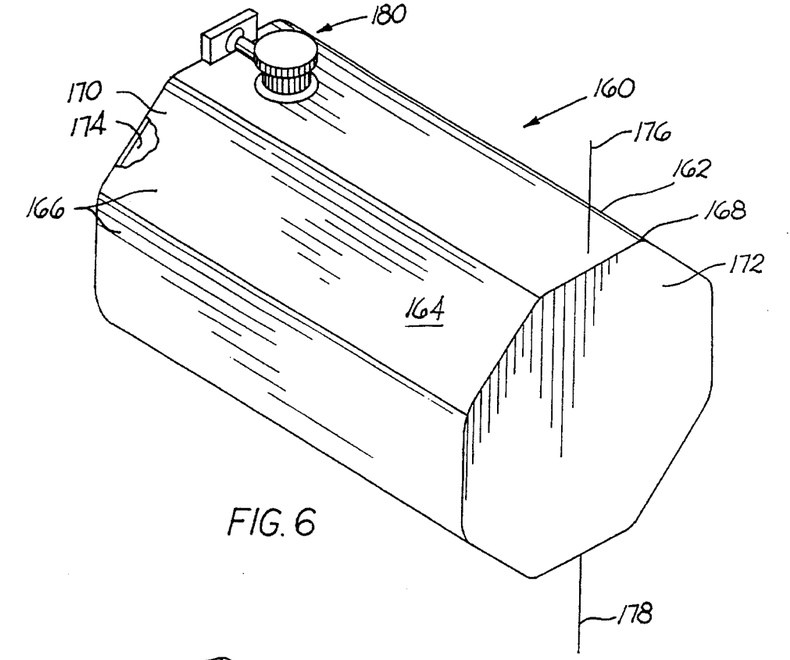
FIG. 6 is a perspective view of an additional embodiment of the spacecraft structure invention.
Figure 7:
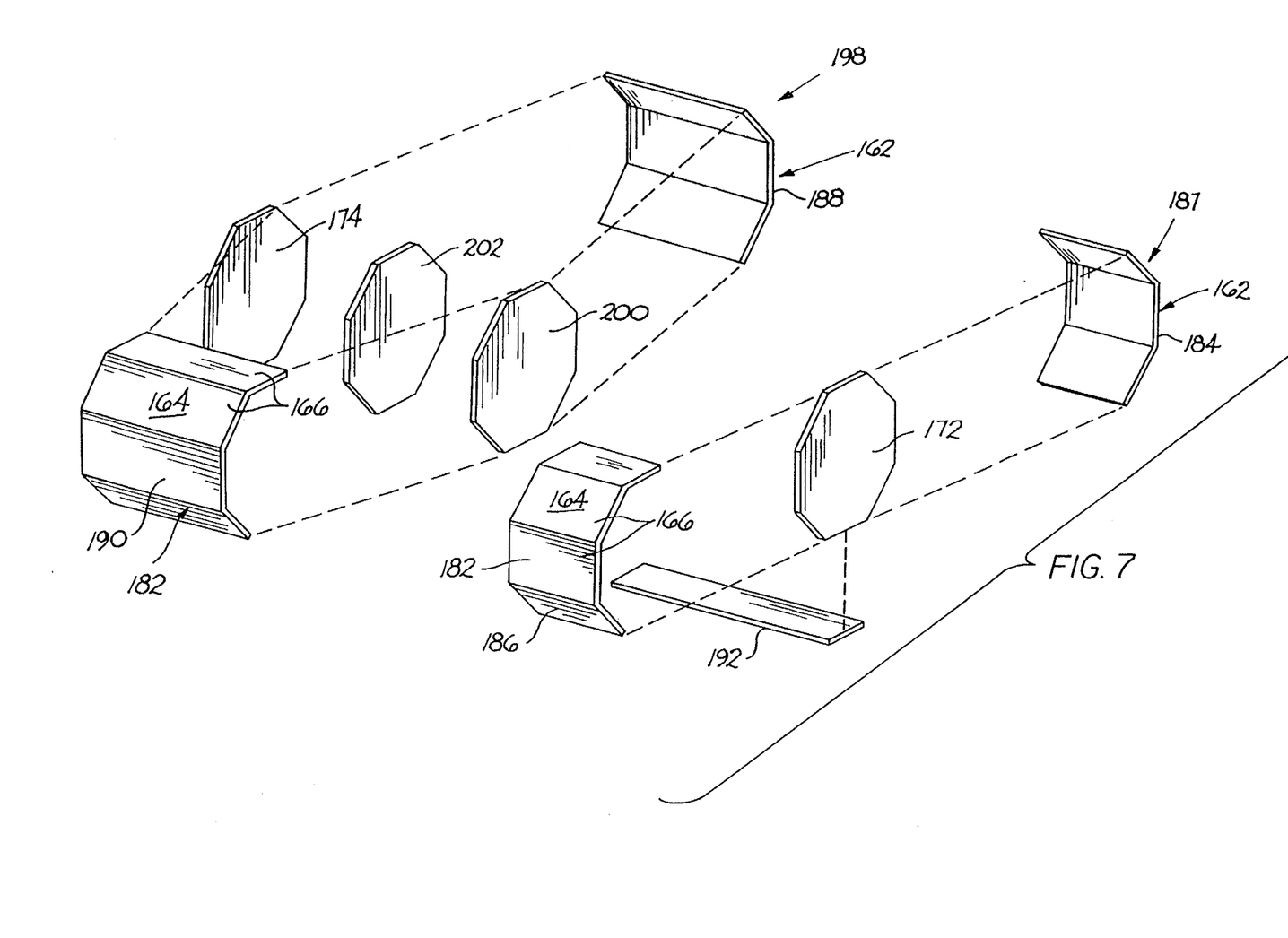
FIG. 7 is an exploded perspective view of the spacecraft structure invention illustrated in FIG. 6.

Another embodiment of the spacecraft structure invention is illustrated in FIGS. 6 and 7 and is designated generally by the number 160. The spacecraft structure 160 could also be a satellite comprising a generally prismatic polygon structure 162 with a surface with flat portions 164 that is shaped to generally conform to the perimeter of a polygon that has a plurality of substantially flat surfaces 166. The cylindrical prismatic polygon body 162 has a forward end portion 168 and an aft end portion 170. The forward end portion 168 of the cylindrical prismatic polygon body 162 is closed by a forward bulkhead or deck 172 and the aft end portion 170 of the cylindrical body 162 is also closed by an aft bulkhead or deck 174. As illustrated, the spacecraft structure 160 has two antennas 176 and 178 extending from its surface 164 plus some additional pieces of equipment designated by the number 180. The illustration of the spacecraft structure 160 in FIG. 6 shows the spacecraft structure 160 as it would appear after it had been launched such as when it was in orbit in space.

FIG. 7 is an exploded view of the basic spacecraft structure 160 illustrated in FIG. 6 that illustrates the various components that make up the spacecraft structure 160. As illustrated, the body structure 162 comprises a series of shell members designated generally by the number 182. In the preferred embodiment, the series of shell members 182 has two payload shell members 184 and 186 and two bus shell members 188 and 190. These shell members 184, 186, 188 and 190 plus a removable pan member 192 serve to provide the exterior surface 164 for the body structure 162. The payload shell members 184 and 186 form the major part of what is called the payload structure 187.

The forward end portion 168 of the body structure 162 is closed by the thin substantially flat forward or payload deck 172 and the aft end portion 170 of the body structure 162 is closed by the thin previously described substantially flat aft deck 174. The shell members 188 and 190 form a major portion of a shell for what is called a core bus structure 198 and its forward portion is closed by a thin substantially flat forward deck 200. An additional thin substantially flat mid deck 202 may be located substantially between the decks 174 and 200 within the shell members 188 and 190. As previously indicated in FIG. 6, the various shell members 184, 186, 188 and 190 each have a series of outer panel segments or surfaces 166.

Figure 8:
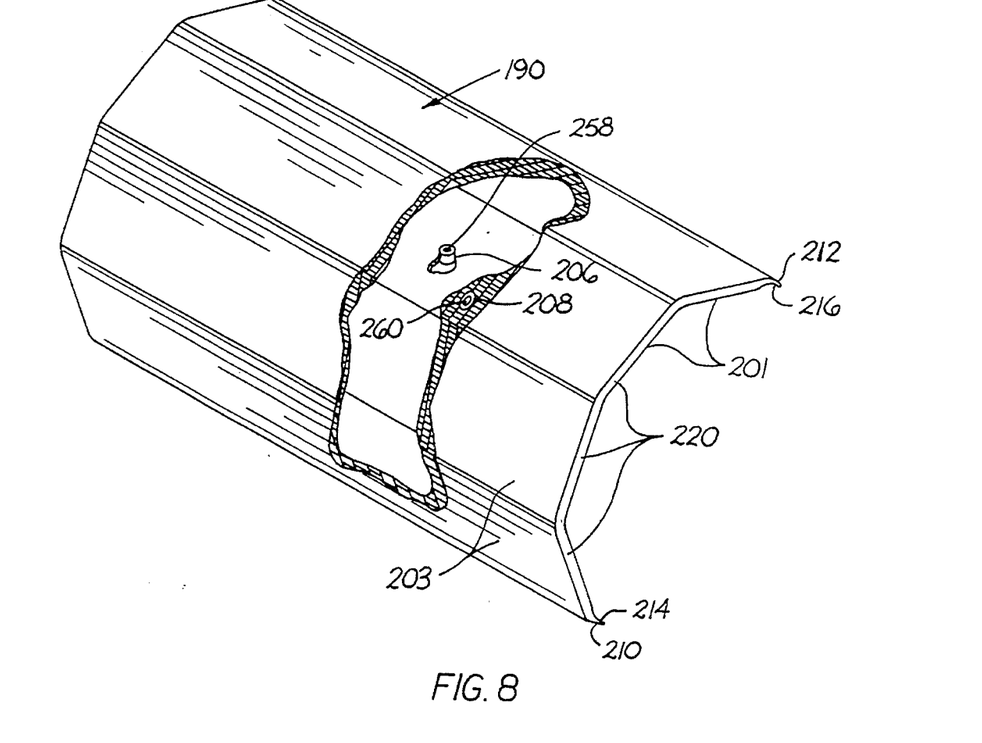
FIG. 8 is an enlarged perspective view of a portion of the spacecraft structure illustrated in FIG. 7 with portions broken away for clarity.

FIG. 8 is an enlarged view of the shell member 190 illustrated in FIG. 7 with a portion broken away. As illustrated in FIG. 8, the shell member 190 comprises an inner thin solid panel 201 and an outer thin conforming flat faceted panel 203. The panel 201 has inserts 206 and 208 in it that are used to mount a payload or equipment within the payload section 182 of the body structure 162 of the spacecraft structure 160. The respective outer edges 210 and 212 of the panel 203 are connected to the respective outer edges 214 and 216 of the panel 201. The shell member 190 also comprises an overexpanded honeycomb member 220 that is located between the panels 201 and 203.

Figure 9:
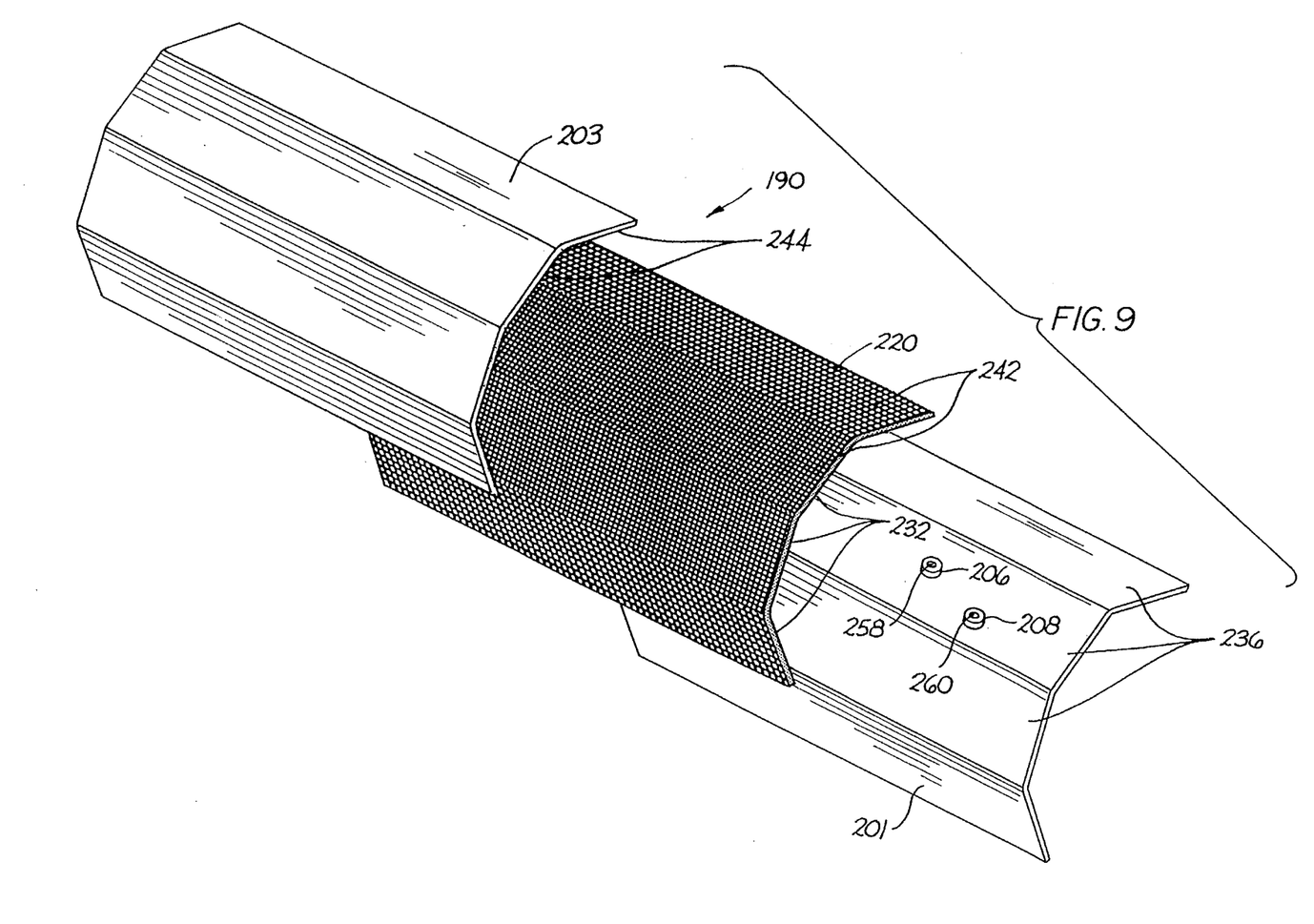
FIG. 9 is an exploded perspective view of the structure illustrated in FIG. 8.

FIG. 9 is an exploded view of a portion of the panel member 190 illustrated in FIG. 8 showing in greater detail the panel member 190 and its various components. FIG. 9 shows the previously mentioned panels 201 and 203 and the overexpanded honeycomb member 220. The honeycomb member 220 has substantially flat inner surfaces 232 that are sized and shaped to conform to the respective substantially flat outer surfaces 236 of the panel 201. The overexpanded honeycomb member 220 has a substantially flat outer surface 242 that is sized and conforms to the inner substantially flat surface 244 of the outer panel 203.

As previously indicated, the panel 201 has inserts such as 206 and 208 that are secured to the panel 201 and extend completely through the panel to its outer surfaces 236. These inserts 206 and 208 can have respective through holes or threaded holes 258 and 260 for mounting equipment and the like. All of the panel member 190 components 201, 203, and 220 are bonded together using conventional bonding techniques known in the art to produce the combined structure 190 illustrated in FIG. 8.

Figure 10:
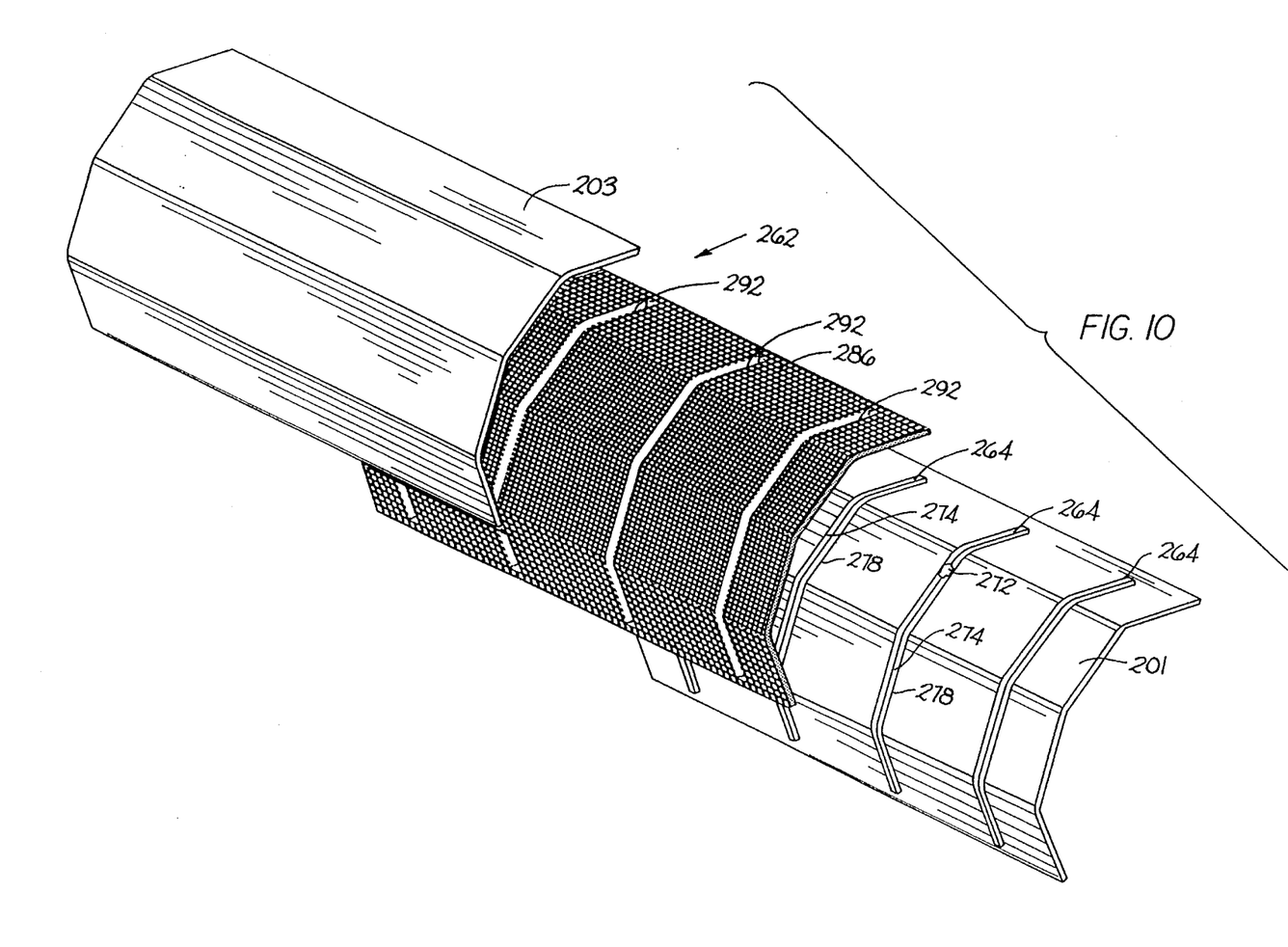
FIG. 10 is an enlarged perspective view of an alternative to a portion of the spacecraft structure illustrated in FIGS. 7, 8 and 9 with certain portions broken away for clarity illustrating installed heat pipes as an additional embodiment of the invention.

FIG. 10 illustrates an alternative to the panel member 190 illustrated in FIGS. 8 and 9 that is designated generally by the number 262. As illustrated, the panel member 262 includes some of the same members as the previously described panel member 190, namely the panels 201 and 203. The panel member 262 also includes a series of generally rectangular hollow cross sectional equally spaced heat pipe members 264. Each hollow heat pipe member 264 contains a heat transfer fluid such as the heat transfer fluid 272. Each heat pipe member 264 is a continuous hollow rectangular cross section member whose respective undersides 278 substantially conform to and are in contact with the inner surfaces of the panel member 201.

The panel member 262 also has a honeycomb member 286 that is similar to the previously described honeycomb member 220 of the panel 190. The honeycomb member 286 has a series of slots 292 that are sized, shaped and located to receive adjacent portions of the respective heat pipes 264. The various components of the panel member 262 are assembled in the same manner as the panel member 190 by bonding them together using conventional bonding techniques known in the art.

The spacecraft structure 10 is manufactured in the following manner. The various decks 20, 22, 50 and 52 are manufactured using expanded aluminum honeycomb that is sandwiched and bonded between two thin cut to size sheets of aircraft grade aluminum sheet. The various panels are assembled in a manner similar to the previously described panel members 36 and 106. The panels 54 and 56 of the panel members 36 and 106 are cut and formed from solid aircraft grade sheet aluminum using known techniques. The inserts 44 are made from solid high strength aluminum alloy using standard machining and thread tapping techniques. The inserts 44 are located in suitable holes made in the panel 54 and are bonded to panel 54 as well as the respective honeycomb portions 94 and 96. The longitudinal members 74 and 134 are machined from expanded aluminum honeycomb core using conventional techniques. The honeycomb members 66, 68, 130 and 132 each have an aluminum expanded honeycomb 94 or 96 and a stabilized respective surrounding border 98 or 100 that is bonded using methods known in the art to the aluminum expanded honeycomb portions 94 or 96. As previously indicated, the honeycomb members 130 and 132 are cut using conventional techniques to provide slots for portions of the heat pipes 108 that are made from aluminum extrusions and filled with a suitable heat transfer liquid in a conventional manner. As previously indicated, the components for the panel members 40 and 106 are bonded together in a known conventional manner. All of the other panel members including the removable panel member 42 are constructed in a similar manner and hence they do not need to be discussed individually. The panel members 34, 36, 38 and 40 are connected to each other and to the deck members 20, 22, 50 and 52 in a conventional manner using conventional connecting and bonding techniques to form the complete satellite structure 10 set forth in FIG. 1. The spacecraft structure 160 is manufactured substantially in the same manner as the spacecraft structure 10.

The spacecraft structures 10 and 160 are used in the following manner. The payload (not shown) electronic equipment or the like, is secured within the payload section 43 using the previously described inserts 44 in the panel 54 and others (not shown) by bolting the payload equipment to the inserts 44 and hence the panel 54 using their threaded holes 105. After the payload has been secured within the payload section 43 that forms a part of the satellite structure 10 it can be checked out and serviced by removing panel 42 to allow access to the payload. The same procedure is used for the spacecraft structure 160.

Figure 11:
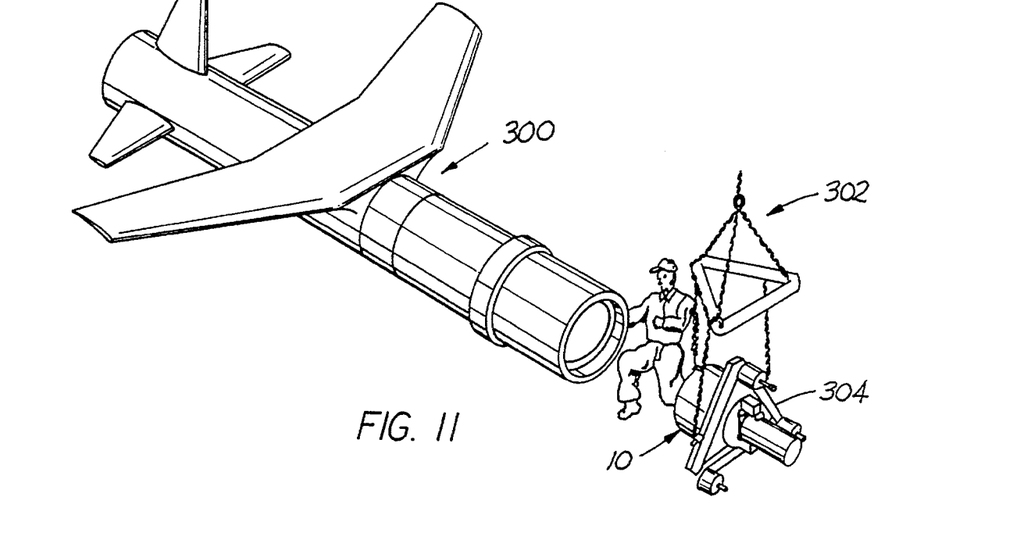
FIG. 11 is a perspective view of a fully constructed spacecraft with the spacecraft structure invention being mated to a spacecraft launch vehicle.

After the payload has been secured within the payload structure section 43 of the satellite structure 10 and serviced and/or checked out if necessary, the spacecraft structure 10 is mated or integrated as illustrated in FIG. 11 to a space launch vehicle designated generally by the number 300 that is known in the art. This can be accomplished as illustrated in FIG. 11 by using a suitable hoist with only a portion being illustrated and designated by the number 302 and an associated mounting fixture 304 that secures the spacecraft structure 10 to the hoist 302. The spacecraft structure 10 is then maneuvered into position and secured to the space launch vehicle 300 using conventional techniques. The spacecraft structure 10 is then launched into space through the use of the space launch vehicle 300. The spacecraft structure 10 is suitable for a variety of uses in space including being placed in transfer orbit for interplanetary travel. All of the panels provide the outside surface for the spacecraft structure 10 but in addition they serve as the frame or load support for the spacecraft structure 10 and hence the spacecraft structure 10 has no other frame structure of any kind. The same launch procedure is used for the spacecraft structure 160 as for the spacecraft structure 10.

Figure 12:
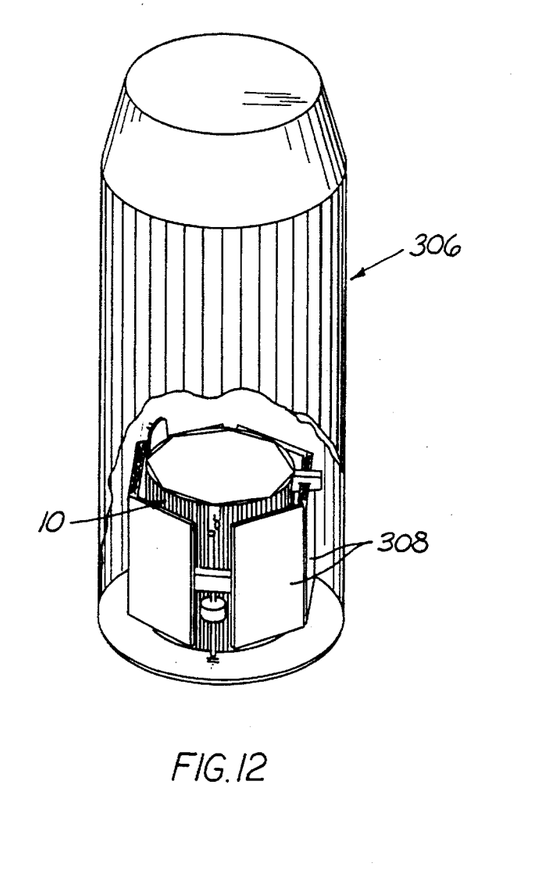
FIG. 12 is a perspective view of one embodiment of the spacecraft structure invention in its launch configuration within a launch vehicle with a portion thereof broken away for clarity.
Figure 13:
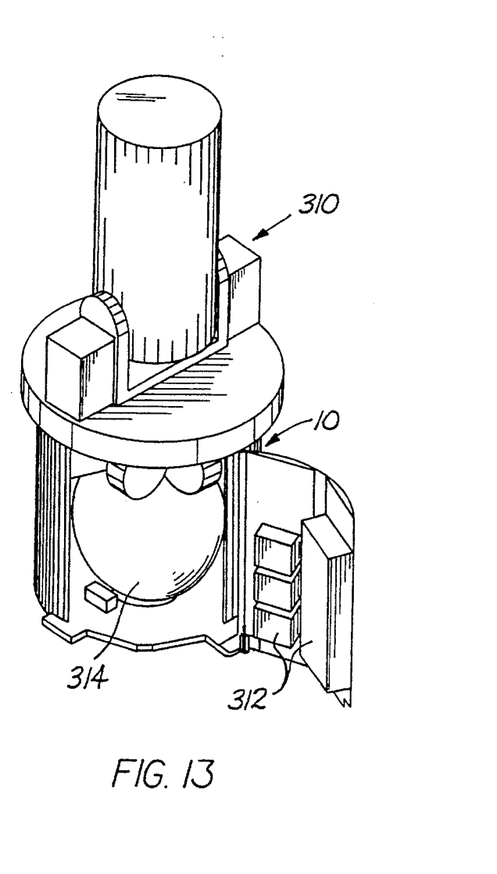
FIG. 13 is a perspective view of another embodiment of the spacecraft invention in its configuration showing internal accessibility.

FIG. 12 illustrates the spacecraft structure 10 located within a space launch vehicle 306. The spacecraft structure 10 has an array of deployable panels 308 located around it within the launch vehicle 306. FIG. 13 illustrates another spacecraft designated by the number 310 that incorporates the spacecraft structure embodiment 10 with a portion thereof open to show equipment 312 located on the interior walls of the spacecraft structure 10 with additional equipment 314 located in the interior of the spacecraft structure 160.

Figure 14:
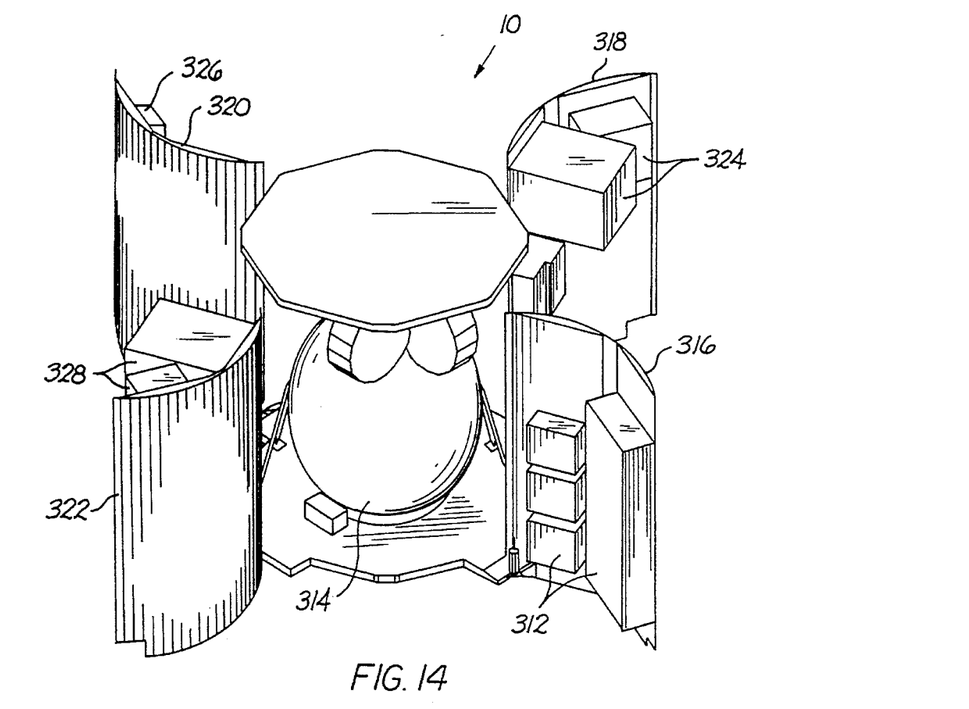
FIG. 14 is a perspective view of a portion of the structure illustrated in FIG. 13 showing the spacecraft structure in its equipment integration phase.
Figure 15:
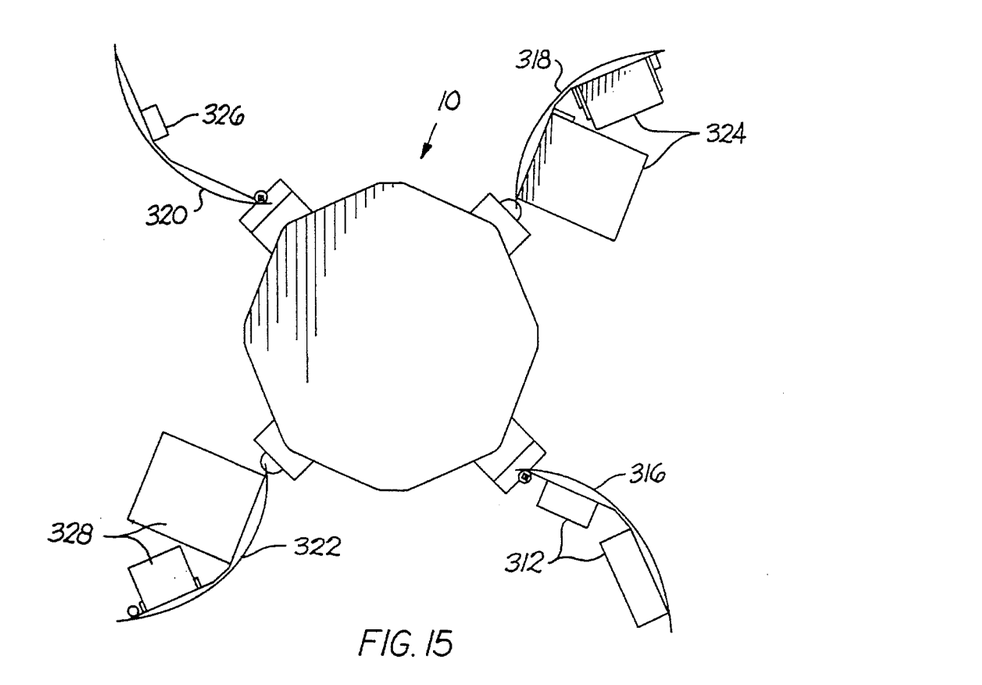
FIG. 15 is a top plan view of the structure illustrated in FIG. 14.

FIG. 14 is an enlarged view of a portion of the perspective view in FIG. 13 illustrating the spacecraft structure 10 in greater detail. As illustrated, all of the four panels 316, 318, 320, and 322 with their respective interior panel mounted equipment packages 324, 326, and 328 are shown in their open service or equipment access positions. FIG. 15 is a top plan view of the structure illustrated illustrated in FIG. 14 that shows how the four panels 316, 318, 320 and 322 are capable of presenting their respective equipment packages 312, 324, 326 and 328 outside the exterior of the spacecraft structure 160.

Figure 16:
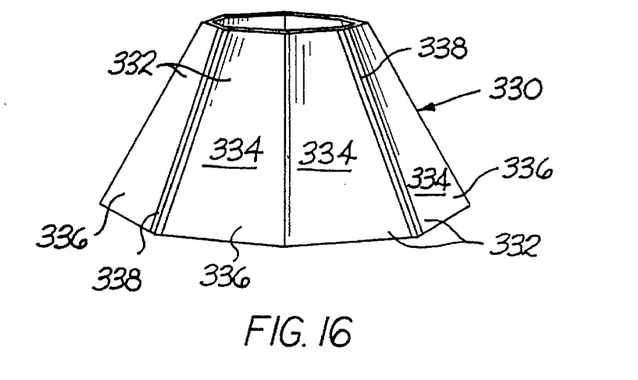
FIG. 16 is a perspective view of an additional embodiment of the spacecraft structure invention having a conical external configuration.
Figure 17:
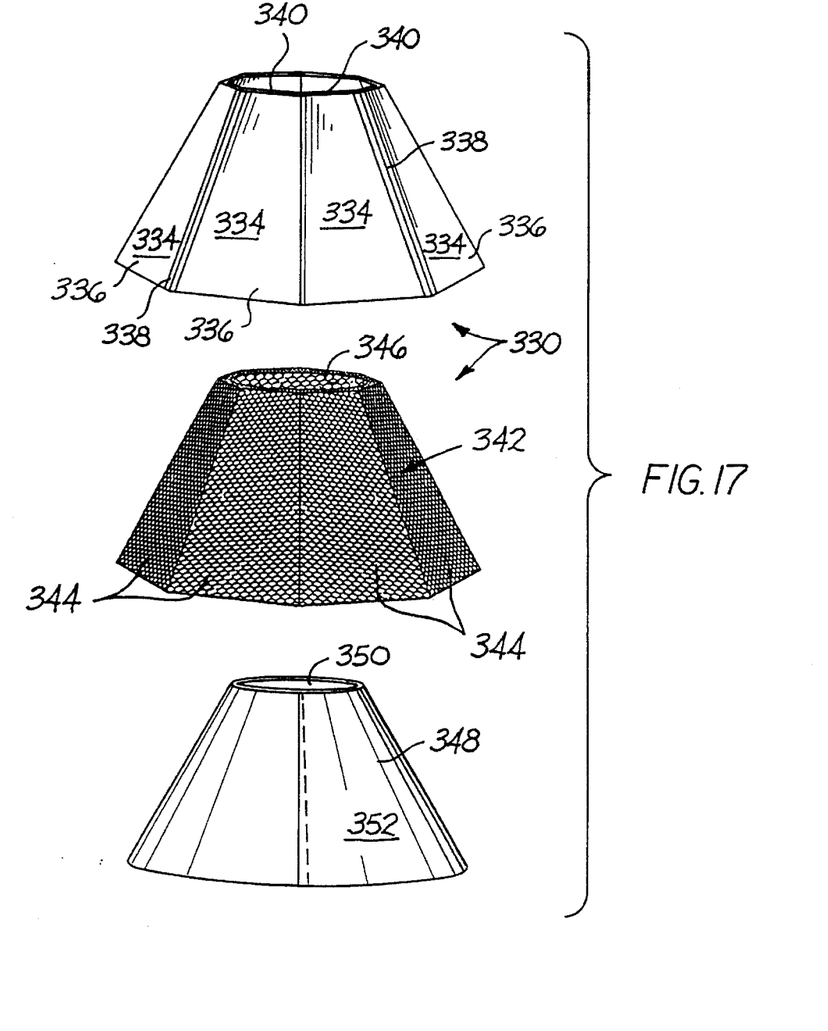
FIG. 17 is an exploded perspective view of the spacecraft structure invention illustrated in FIG. 16.

Another embodiment of the spacecraft structure invention is set forth in FIGS. 16 and 17 and is designated generally by the number 330. The spacecraft structure 330 includes an outer generally faceted cone shaped surface 332 that has a series of substantially identical truncated generally trapezoidal shaped flat surface portions 334. The surface 332 comprises a series of adjacently located members 336 that each have two adjacent flat surfaces 334. These members 336 are secured together by a series of substantially identical splice members 338 that connect the adjacently located members 336 together in an edge to edge relationship to form the outer generally cone shaped surface 332. It should be noted that each member 336 has two inner flat surfaces 340 whose shape substantially match the exterior surfaces 334.

The spacecraft structure 330 also comprises a flex honeycomb core layer member 342 that is made from a one piece expanded honeycomb sheet. This sheet or layer member 342 has a series of substantially identical substantially flat surfaces 344 that substantially match the inner surfaces 340 of the members 336. The inner surface 346 of this layer member 342 is substantially smooth. The spacecraft structure 330 also comprises an inner thin member 348 with respective inner and outer surfaces 350 and 352 that are adapted to be curved and the surface 352 substantially matches the inner surface 346 of the member 342. This member 348 is assembled to form a hollow cone shaped member.

The spacecraft structure embodiment 330 is used in the same manner as the previously described embodiments. The spacecraft structure embodiment 330 is manufactured in the following manner. The inner member 348 is cut using known techniques from a thin sheet of high grade aluminum sheet stock and the honeycomb member 342 is also cut from a expanded honeycomb material in a manner well known in the art. The members 336 and 338 are manufactured using known techniques from a suitable high grade aluminum material. The inner member 348 and the honeycomb member 342 are bonded together on a suitable fixture known in the art and the surfaces 344 are machined using conventional techniques. The members 336 are then bonded to the honeycomb member 342 and the splice members 338 are bonded to the corners of the members 336 to secure them together in a manner known in the art.

Although the invention has been described in considerable detail with reference to certain preferred embodiments, it will be understood that variations or modifications may be made within the spirit and scope of the invention as defined in the appended claims.

What is claimed is:

1. A spacecraft structure having a curved outer surface, comprising:
   a generally cylindrical body structure comprising a series of panel members;
   at least one of said series of panel members comprising an inner panel, an outer panel, and a honeycomb member located between said inner panel and said outer panel, with said outer panel forming a portion of the curved outer surface of said spacecraft structure; and,
   at least one insert located in said inner panel for mounting payload to said spacecraft structure;
   said panel members providing sole load support for said spacecraft structure, whereby said spacecraft structure is of frameless construction.

2. The spacecraft structure of claim 1 further comprising heat transfer means operatively associated with said honeycomb member for distributing heat within said honeycomb member.

3. The spacecraft structure of claim 2 wherein said heat transfer means comprises at least one heat pipe.

4. The spacecraft structure of claim 1 wherein said inner panel has a plurality of flat surfaces.

5. The spacecraft structure of claim 4 further comprising heat transfer means operatively associated with said honeycomb member for distributing heat within said honeycomb member.

6. The spacecraft structure of claim 5 wherein said heat transfer means comprises at least one heat pipe.

7. The spacecraft structure of claim 6 wherein said heat pipe has exterior surfaces and wherein the exterior surfaces of at least a portion of said heat pipe substantially conform to the shape of said inner panel.

8. The spacecraft structure of claim 1 wherein said outer panel has a plurality of flat surfaces.

* * * * *